US010140687B1

(12) United States Patent
Engel (10) Patent No.: US 10,140,687 B1
(45) Date of Patent: Nov. 27, 2018

(54) REAL TIME WIDE ANGLE VIDEO CAMERA SYSTEM WITH DISTORTION CORRECTION

(71) Applicant: Geoffrey Stephen Engel, West Chester, PA (US)

(72) Inventor: Geoffrey Stephen Engel, West Chester, PA (US)

(73) Assignee: RAPC Systems, Inc., West Chester, PA (US)

( * ) Notice: Subject to any disclaimer, the term of this patent is extended or adjusted under 35 U.S.C. 154(b) by 235 days.

(21) Appl. No.: 15/007,374

(22) Filed: Jan. 27, 2016

(51) Int. Cl.
| | |
|---|---|
| *H04N 7/00* | (2011.01) |
| *G06T 5/00* | (2006.01) |
| *H04N 5/232* | (2006.01) |
| *H04N 5/225* | (2006.01) |
| *H04N 5/247* | (2006.01) |
| *H04N 5/77* | (2006.01) |
| *G06T 5/50* | (2006.01) |

(52) U.S. Cl.
CPC ............... *G06T 5/002* (2013.01); *G06T 5/50* (2013.01); *H04N 5/2253* (2013.01); *H04N 5/23238* (2013.01); *H04N 5/247* (2013.01); *H04N 5/77* (2013.01); *G06T 2207/10016* (2013.01); *G06T 2207/20221* (2013.01)

(58) Field of Classification Search
CPC H04N 5/50; H04N 5/77; H04N 5/247; H04N 5/2253; H04N 5/23238; G06T 5/50
See application file for complete search history.

(56) References Cited

U.S. PATENT DOCUMENTS

| | | | | |
|---|---|---|---|---|
| 6,141,034 A * | 10/2000 | McCutchen | ........... | G02B 27/22 348/36 |
| 7,894,661 B2 * | 2/2011 | Kosaka | .................... | G06T 7/80 348/42 |
| 8,427,538 B2 | 4/2013 | Ahiska | | |
| 8,619,248 B2 * | 12/2013 | Bassi | ................. | G01M 11/0264 356/127 |
| 8,675,959 B2 * | 3/2014 | Mizutani | .............. | G06K 9/4652 382/151 |
| 9,071,732 B2 | 6/2015 | McClatchie | | |
| 9,118,831 B2 | 8/2015 | Kamiya | | |
| 9,165,445 B2 | 10/2015 | Hinkel | | |
| 9,183,669 B2 | 11/2015 | Liu | | |
| 9,196,022 B2 | 11/2015 | Li | | |
| 2004/0170315 A1 * | 9/2004 | Kosaka | ................... | G06T 5/006 382/154 |

(Continued)

*Primary Examiner* — Jeremiah C Hallenbeck-Huber
*Assistant Examiner* — Boubacar Abdou Tchoussou
(74) *Attorney, Agent, or Firm* — Andrew L. Salvatore, Esquire (57) ABSTRACT

A wide angle video camera system which eliminates barrel distortion and increase the field of view by combining multiple images. Image distortion may be corrected through use of a jig to determine the field of view and distortion parameters of a camera lens. From these measurements, one may calculate the amount of adjustment needed at various points in the image. Once the image correction parameters are determined for a particular camera lens, the real time image obtained from the camera may be corrected immediately, without the need for post image processing to correct for distortion. As multiple overlapping images may be immediately corrected, they may also be instantaneously aligned and combined into a single image.

14 Claims, 12 Drawing Sheets

(56) References Cited

U.S. PATENT DOCUMENTS

| | | | | |
|---|---|---|---|---|
| 2008/0002041 | A1* | 1/2008 | Chuang | H04N 9/3185 348/241 |
| 2009/0190826 | A1* | 7/2009 | Tate | H04N 1/00002 382/153 |
| 2010/0134634 | A1* | 6/2010 | Witt | H04N 5/2224 348/181 |
| 2011/0157373 | A1* | 6/2011 | Ye | G06T 7/85 348/187 |
| 2013/0108155 | A1* | 5/2013 | Mizutani | H04N 17/002 382/165 |
| 2013/0265571 | A1* | 10/2013 | Bassi | G01M 11/0264 356/127 |
| 2014/0267596 | A1* | 9/2014 | Geerds | H04N 5/2252 348/38 |
| 2014/0340508 | A1* | 11/2014 | Yamamoto | B23Q 17/2233 348/94 |
| 2015/0306824 | A1* | 10/2015 | Flores Mangas | G05B 15/02 700/98 |
| 2016/0073101 | A1* | 3/2016 | Keaffaber | G06T 7/80 348/187 |
| 2016/0182903 | A1* | 6/2016 | Grundhofer | G06T 7/80 348/187 |
| 2016/0253795 | A1* | 9/2016 | Cole | G02B 27/0172 345/426 |
| 2016/0373734 | A1* | 12/2016 | Cole | H04N 17/002 |

\* cited by examiner

Pincushion Distortion

Fig. 4b

Distortionless Image

Fig. 4c
Barrel Distortion

REAL TIME WIDE ANGLE VIDEO CAMERA SYSTEM WITH DISTORTION CORRECTION

BACKGROUND OF THE INVENTION

The invention relates to the creation of a real time wide angle video camera system which instantaneously corrects distortion associated with a wide angle camera lens. By virtue of the rapid image correction process of the invention, images may be corrected in real time, without post image creation processing, which also enables images from multiple cameras to be seamlessly combined into a wide angle image whose undistorted field of view is unattainable with single camera lenses of the prior art.

The current information age and the increases in technology have enabled people to obtain and utilize information at a unprecedented rate greater than any other point in history. Computers enable people to utilize the internet to search for information and transmit such information at unprecedented rates through any number of communication channels. The need for information exchange has enhanced our knowledge, opened new opportunities for entertainment, and increased our ability to secure ourselves against danger.

Still photography and video imaging are well known in the art, and by themselves, they have enhanced our capacity to enjoy life and maintain our public safety. However, even with recent advances in technology, video imaging continues to suffer from drawbacks which hinder the ability to accurately and rapidly display video images. Often important in capturing a video image, a wide field of view is desired. However, with any wide angle lens, as the field of view is increased, the image becomes increasingly distorted, bulging outward at points closer to the center and inward further from the center of the image. Images are distorted with increasing field of view as image magnification decreased further from the optical axis. Accordingly, not only are traditional wide angle lenses physically limited in their ability to capture a wide field of view, the image obtained from such lenses is increasingly less accurate, i.e. distorted, as the field of view becomes wider.

The prior art contains many attempts to correct for image distortion by employing different adjustment techniques to images to restore the image to its undistorted appearance. Various algorithms may be utilized to adjust the image and remove distortion based on the amount of distortion at various points in the image. However, traditionally such distortion removal techniques could only be performed after the image was taken resulting in delayed ability to observe distortion removed images.

In addition to the limitations in distortion correction, traditionally a single wide angle lens is physically limited in its ability to capture a wide field of view. Combining multiple overlapping images is hindered by the distortion created in each image which prevents similar elements in each image from aligning. Still photos may be processed after the images are taken to correct for distortion, align image components, and combine the images. However, traditional techniques render alignment of overlapping video images in real time virtually impossible as the images from each frame must be instantly corrected, aligned, and combined. Under traditional prior art techniques, the amount of time required to process each frame of real time video renders creation of a continuous real time video output impossible.

Image distortion correction systems of the prior art have numerous limitations which do not enable such systems to achieve the real time distortion correction speeds of the invention or the image field of view of the invention. For instance, Li, U.S. Pat. No. 9,196,022 provides for a only single video camera to be mounted on the back of a vehicle and cannot provide for increased field of view as only one camera is utilized. Li provides no means for calculating and correcting the images obtained from a variety of cameras to instantly combine the images. Similarly, Kamiya in U.S. Pat. No. 9,118,831 discusses only one camera and cannot combine multiple images to increase the field of view.

Liu in U.S. Pat. No. 9,183,669 utilizes a two camera system to record a single image in three dimensions, but does not provide a means of increasing the field of view of an image or correcting distortion. In U.S. Pat. No. 9,071,732, McClatchie combines images to form a broader field of view; however, McClatchie's images are still images, not processed in real time, and do not involve the real time video imaging of the invention.

The prior art fails to provide a means for correcting distortion in real time and combining undistorted images in real time to produce an undistorted wide angle video image in any direction. Accordingly, it is an object of the invention to provide a means of correcting distortion in an image through the use of a jig calibration device which may be used to correct for distortion of any camera. It is a further object of the invention to provide a means of combining multiple images to create an enhanced wide angle view of an image scene in real time which exceeds the capabilities of images created by a single camera lens. It is a further object of the invention to provide a means of correcting camera image distortion in real time thus eliminating the need for post processing of images and saving time and reducing labor costs. The present invention overcomes the limitations of the prior art by providing a means of creating a single undistorted video image from multiple cameras in real time.

SUMMARY OF THE INVENTION

The wide angle video camera system of the invention overcomes the limitations of the prior art by providing a video camera system, involving one or more video cameras, which implements distortion correction to overcome the visual distortion often seen when utilizing wide angle lenses. The invention utilizes several means to eliminate distortion and increase the field of view of the resultant image.

Image distortion may be corrected through use of a jig which serves as a reference point for measuring the field of view and the amount distortion caused by a particular lens. The jig comprises a structure with a horizontal support for a camera so that the camera is positioned in the geometric and focal center of the jig. Horizontally and vertically placed "ribs" on the jig serve as measuring standards to gauge the field of view and the amount of distortion.

When a camera is properly positioned, one is able to measure the camera's vertical field of view (from the bottom of the camera image to the top) by observing the number of horizontal ribs visible within the camera image. In like manner, one is able to measure the camera's horizontal field of view (from one side of the camera image to the other) by observing the number of vertical ribs visible within the camera image.

Distortion may be measured by measuring the amount the "ribs" are deviated from a straight line within the camera image. Ideally, with no distortion, horizontal ribs and vertical ribs would appear as straight lines in the image of a camera. However, with increasing field of view, the image may appear warped as if wrapped around a barrel. The jig assists the user in determining the amount of distortion and permits the user to make accurate calculations to correct the distortion.

Once the image correction parameters are determined for a particular camera lens, the real time image obtained from a camera may be corrected immediately utilizing a central processing unit (CPU), without the need for post image processing to correct for distortion. As multiple overlapping images may be immediately corrected, they may also be instantaneously aligned and combined into a single image. Accordingly, the invention vastly decreases the processing time allowing real time video images from multiple cameras to be taken without distortion and combined into a single, very wide angle single image in real time.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

The wide angle video camera system of the invention overcomes the limitations of the prior art by providing a video camera system, involving one or more video cameras, which overcomes the distortion often seen when utilizing wide angle lenses. The invention utilizes several means to eliminate distortion and increase the field of view of resultant image.

In order to eliminate distortion caused by a camera lens, the inventor has developed a jig which serves as a reference point for measuring the amount distortion caused by a particular lens. By utilizing this reference standard, the inventor was able to develop algorithms to correct for distortion in all points of the resultant camera image, both horizontally and vertically.

The jig is also able to measure the field of view produced by a single camera. In this manner, the inventor is able to confirm and measure with precision the actual field of view in degrees in all directions from the camera's point of view.

The inventor developed the jig to provide an objective means to measure the degrees of field of view of a camera lens and the amount of distortion caused by the lens. The jig was created with a 3-D printer as it would not be possible to create the jig using traditional manufacturing techniques due to its unique shape.

Figure 1:
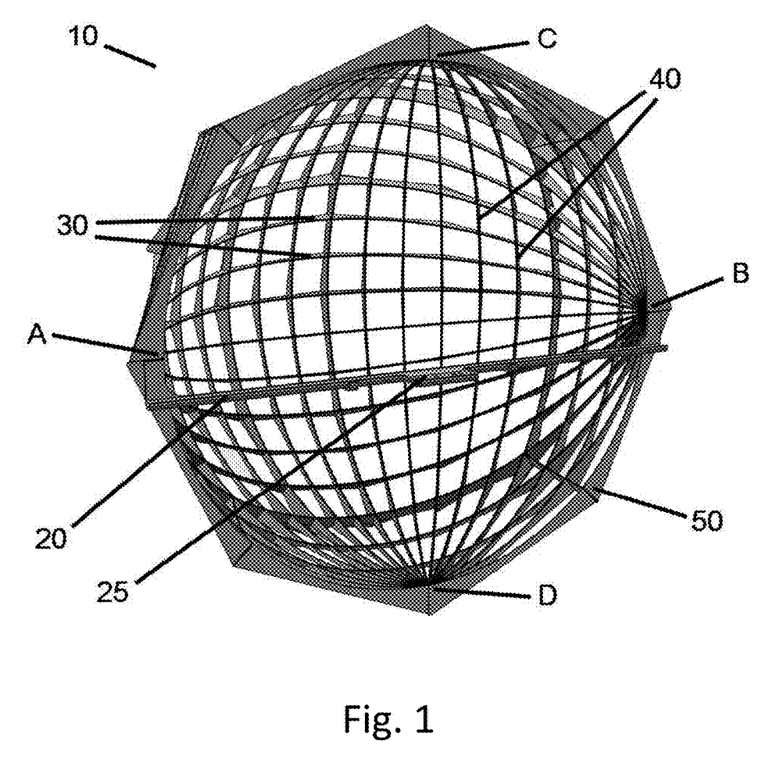
FIG. 1 shows a perspective view of a spherical implementation of a jig from the optical viewing angle used for measurement of camera field of view and distortion according to the invention.

In one possible implementation as shown in FIG. 1, the jig comprises a hemispherical structure 10 with a horizontally located camera support 20 positioned across the back of the jig through the spherical center connected to the hemispherical structure at opposite points A and B. A frame 50 may define the perimeter of the hemispherical structure and the camera support may be connected to the frame. The camera support may contain a camera mounting plate 25.

The jig further comprises horizontally placed "ribs" 30 positioned hemispherically which converge also at horizontal side points A and B. The number of horizontal ribs 30 may vary. However, by way of example, if 19 horizontal ribs are placed from the bottom of the hemispherical shaped structure to the top of the structure, spaced 10° apart, the horizontal ribs provide a series of reference points of covering a field of view of 180°. Although horizontal ribs may be several inches wide to provide necessary support to the hemispherical structure, they may be only a fraction of an inch thick and positioned so that they appear as a thin line from the vantage point of a camera positioned on the camera mounting plate 25.

In a similar manner, the jig may further comprise vertical "ribs" 40 hemispherically positioned and converging at vertical top and bottom points C and D. The ribs may be positioned to cover a field of view of 180° from the center point of the sphere, and may be spaced at various intervals which serve as reference points. Vertical ribs may also constructed wide enough to provide support for the hemispherical structure but thin enough and positioned so as to appear as a thin line when viewed from the camera mounted on the mounting plate 25. The number and spacing of horizontal and vertical ribs may vary to measure varying degrees of field of view.

When a camera is positioned on the plate 25, one is able to measure the camera's vertical field of view (from the bottom of the camera image to the top) by observing the number of horizontal ribs visible within the camera image. In like manner, one is able to measure the camera's horizontal field of view (from one side of the camera image to the other) by observing the number of vertical ribs visible within the camera image.

Figure 2:
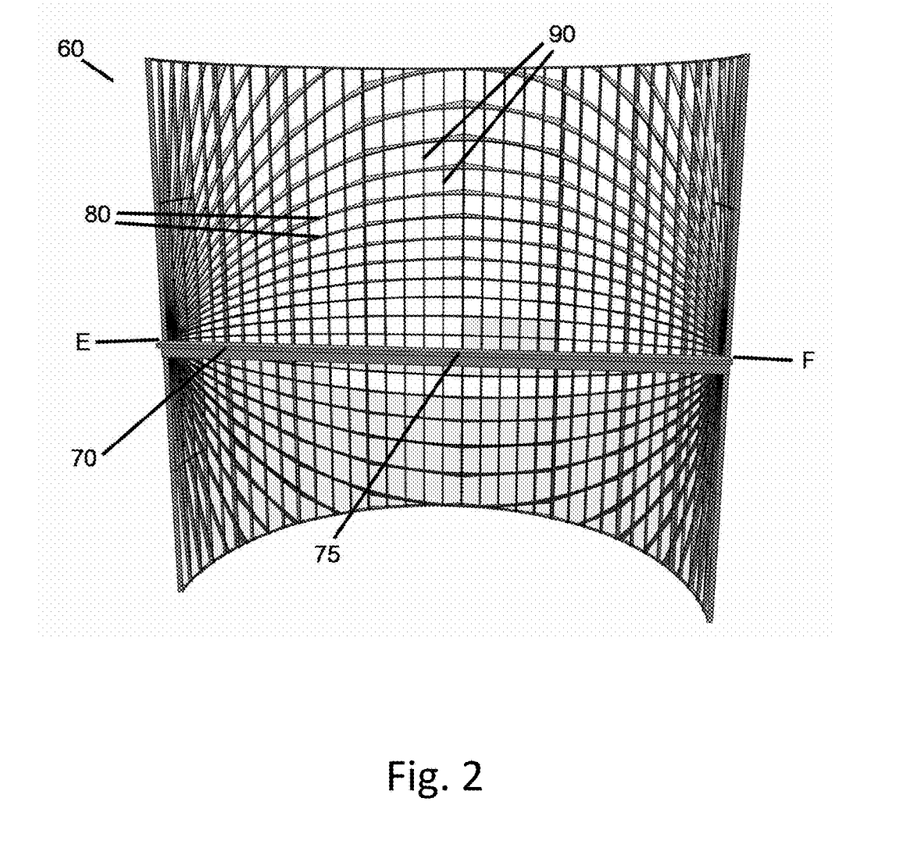
FIG. 2 shows a perspective view of an embodiment of a cylindrical implementation of a jig from the optical viewing angle used for measurement of camera field of view and distortion according to the invention.

In another possible implementation shown in FIG. 2, the jig comprises a cylindrical structure 60 with a horizontally located camera support 70 positioned across the center of the jig connected to the focal points E and F. The camera support may contain a camera mounting location 75 in the center of the support.

The alternative jig further comprises horizontally placed "ribs" 80 positioned hemispherically which converge also at horizontal side points E and F. The number of horizontal ribs 80 may vary. However, by way of example, if 19 ribs are placed at 5° increments as viewed from the camera mounting location 75 at the optical center, the horizontal ribs provide a series of reference points covering a vertical field of view of 90° when viewed from camera mounting location 75. (Similarly, if 37 ribs were placed at 5° increments, the jig could measure a field of view of 180°). Although the horizontal ribs may be quite wide to provide support for the cylindrical structure, they may be only a fraction of an inch thick and positioned so that they appear as a thin line from the vantage point of a camera positioned on the camera mounting position 75.

In a similar manner, the alternative jig may further comprise vertical "ribs" 90 radially positioned with respect to camera mounting position 75. The ribs may be positioned to cover a field of view of 180°, less or greater from the center point of the cylindrical structure, and may be spaced at various intervals which serve as reference points. Vertical ribs may also be constructed wide enough to provide support for the cylindrical structure but thin enough so as to appear as a thin line when viewed from the camera mounted at position 75.

Figure 3:
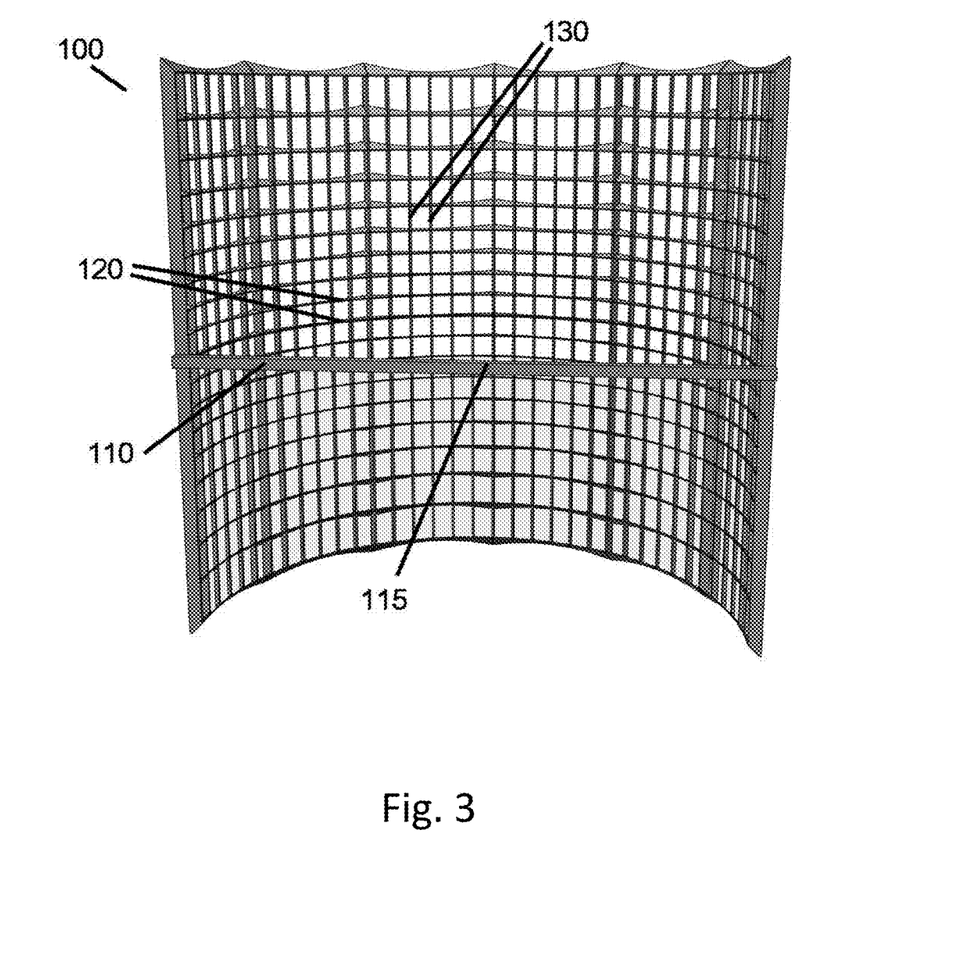
FIG. 3 shows a perspective view of an alternate embodiment of a cylindrical implementation of a jig from the optical viewing angle used for measurement of camera field of view and distortion according to the invention.

In a third possible embodiment shown in FIG. 3, the jig comprises a cylindrical structure 100 with a horizontally located camera support 110 positioned across the center of the jig. The camera support may contain a camera mounting location 115 in the center of the support.

This embodiment of the jig further comprises horizontally placed "ribs" 120 positioned horizontally but angled such that they are all focused on the central camera position 115. The number of horizontal ribs 120 may vary. However, by way of example, if 19 ribs are placed at 5° increments as viewed from the camera position 115 at the optical center, the horizontal ribs provide a series of reference points covering a vertical field of view of 90° when viewed from camera position 115. (Similarly, if 37 ribs were placed at 5° increments, the jig could measure a field of view of 180°). Although the horizontal ribs may be quite wide to provide support for the cylindrical structure, they may be only a fraction of an inch thick and positioned so that they appear as a thin line from the vantage point of a camera positioned on the camera mounting position 115.

In a similar manner, the alternative jig may further comprise vertical "ribs" 130 radially positioned with respect to camera mounting position 115. The ribs may be positioned to cover a field of view of 180°, less or greater from the center point of the cylindrical structure, and may be spaced at various intervals which serve as reference points. Vertical ribs may also be constructed wide enough to provide support for the cylindrical structure but thin enough so as to appear as a thin line when viewed from the camera mounted at position 115.

Figure 4A:
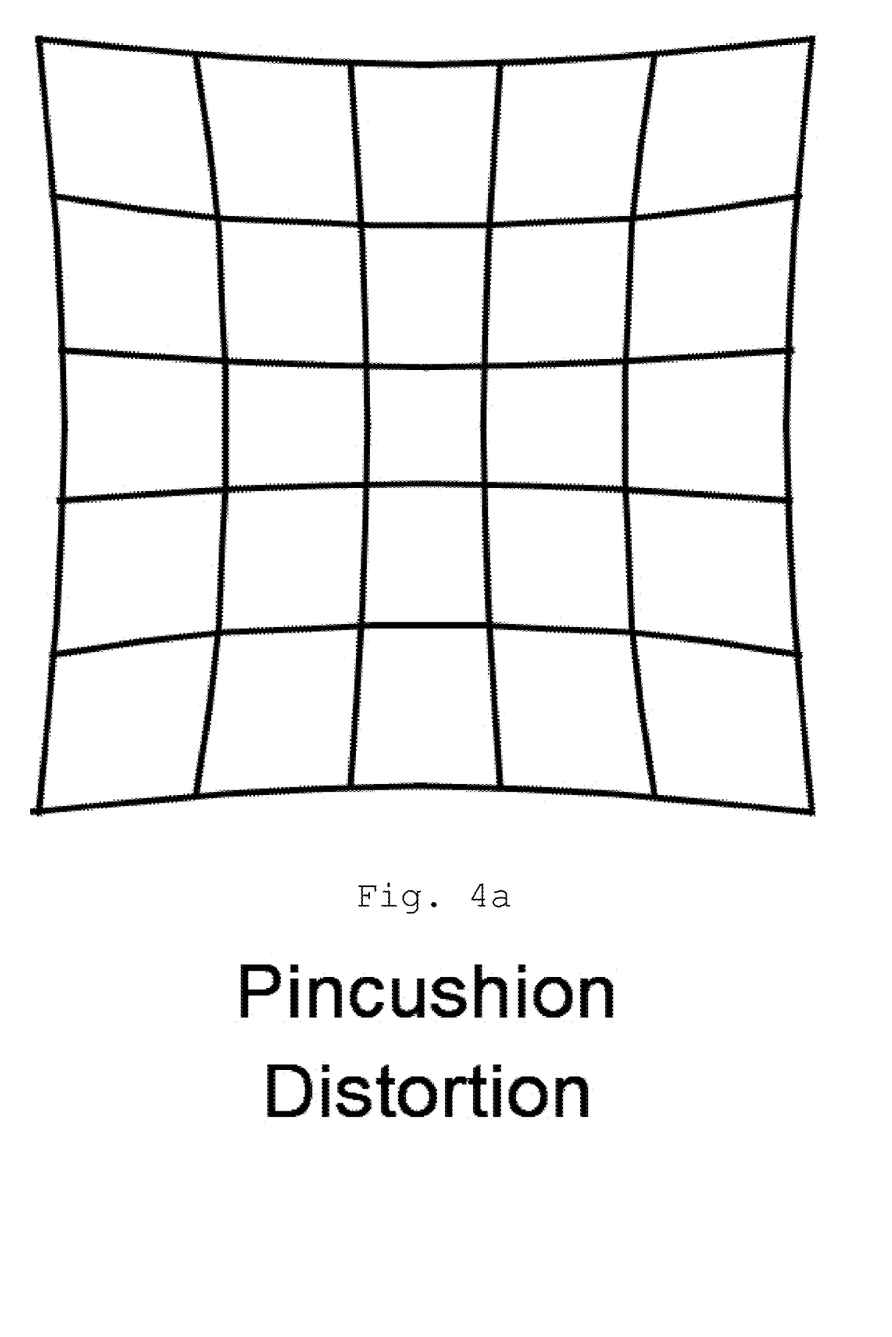
FIG. 4a shows a plan view of a graph depicting the effects of pincushion distortion.
Figure 4B:
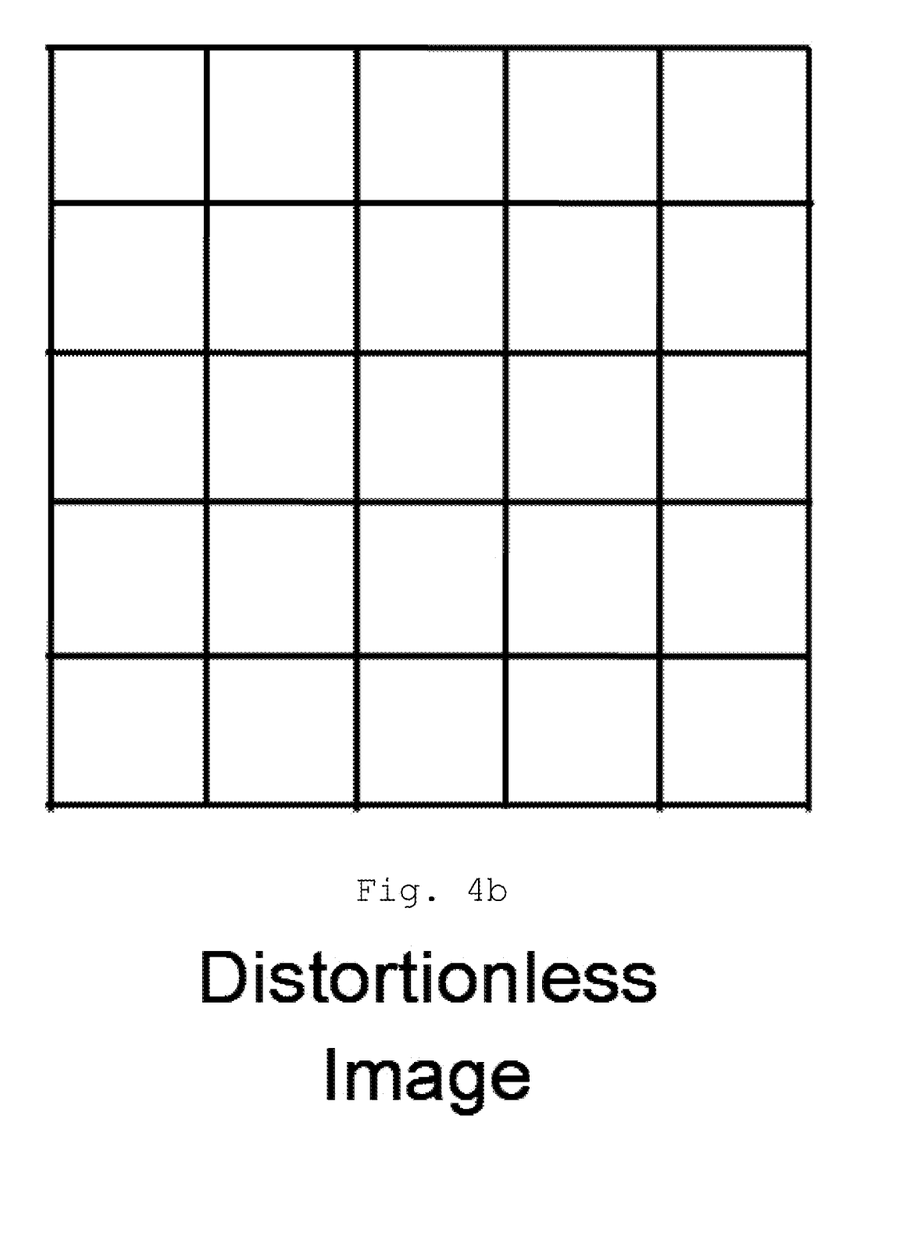
FIG. 4b shows a plan view of a graph depicting no image distortion.
Figure 4C:
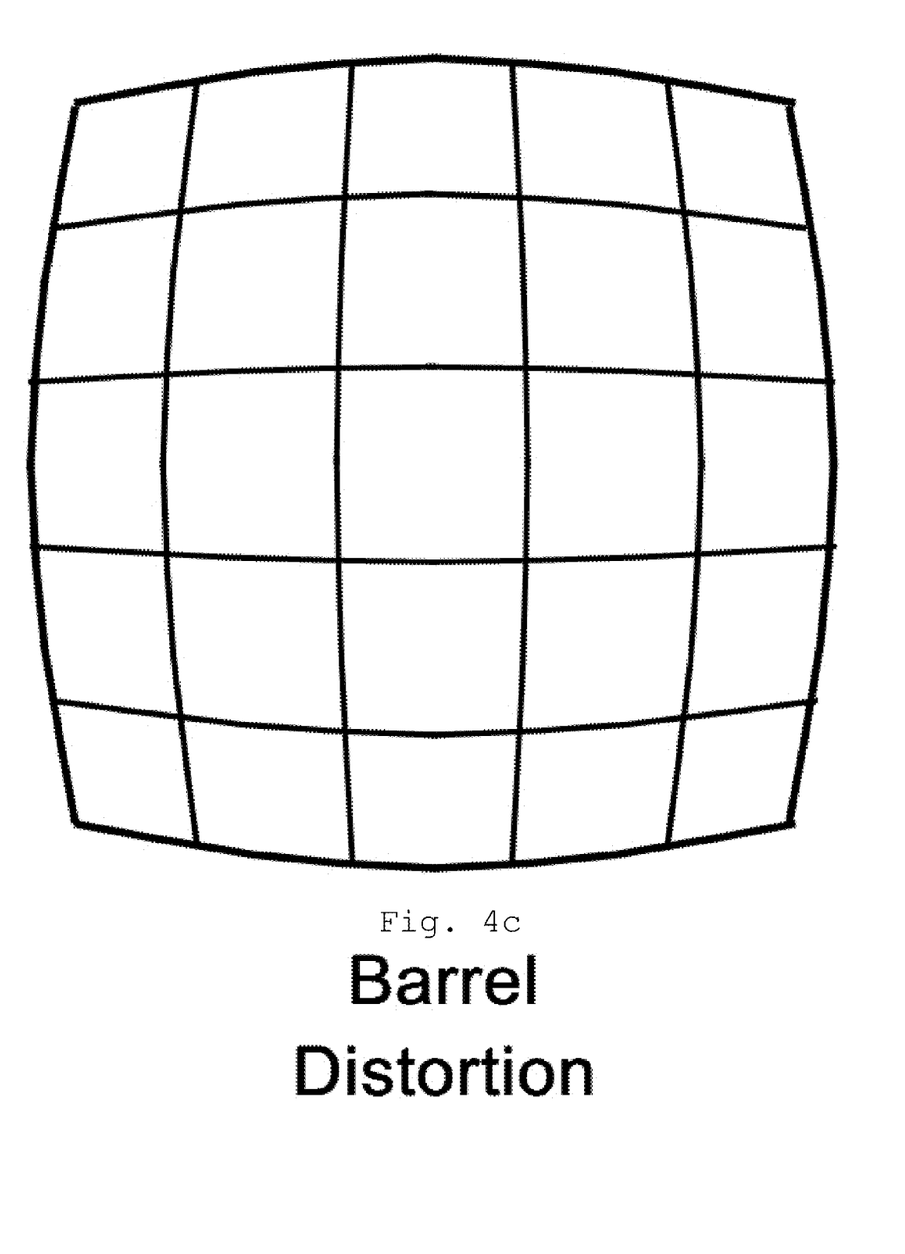
FIG. 4c shows a plan view of a graph depicting barrel distortion.

Further, the jig provides a means of measuring the amount of distortion caused by the camera lens. Ideally, with no distortion, horizontal ribs and vertical ribs would appear as straight lines in the image of a camera. However, with increasing field of view, image magnification decreases further from the optical axis, and the image of a wide angle lens often appears as if it wrapped around a barrel, bulging outward at points closer to the center and inward further from the center of the image. As a camera lens distorts an image, vertical and horizontal ribs are affected by barrel distortion. FIG. 4a graphically depicts the effects of pincushion distortion, FIG. 4b graphically depicts no distortion of an image, and FIG. 4c graphically depicts barrel distortion.

Figure 5:
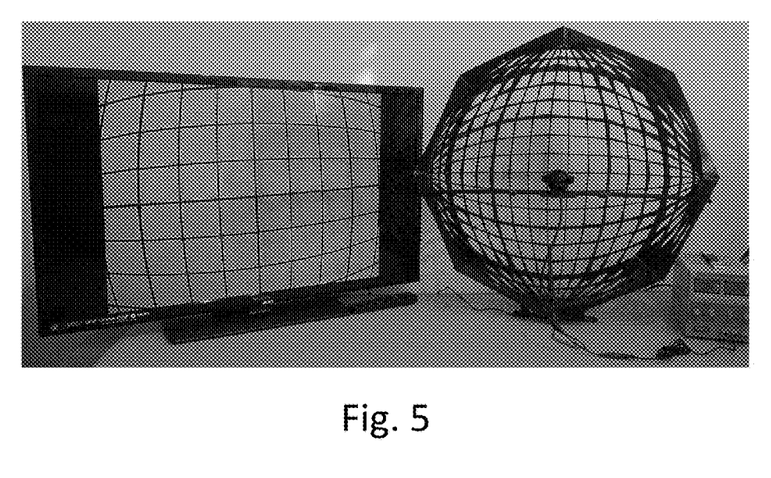
FIG. 5 shows a reference photographic image of the results of testing of camera A on a spherical jig according to the invention.

To illustrate, the inventor conducted testing and analysis on the jig of various cameras from different manufacturers. As shown in FIG. 5, camera A is mounted in the spherical jig. Vertical ribs are spaced 10° apart and the camera is able to view approximately 9 vertical ribs, thus the jig is able to measure the horizontal field of view of or the camera to be approximately 80°. Distortion is shown by the amount of curvature of the lines in the image, and in FIG. 5, vertical and horizontal ribs are relatively straight showing less distortion. Distortion was relatively low due to the limited viewing angle.

Figure 6:
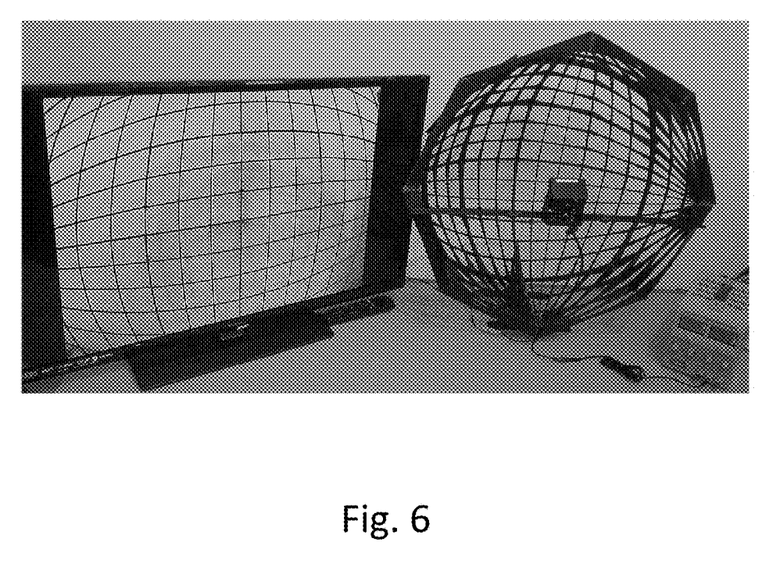
FIG. 6 shows a reference photographic image of the results of testing of camera B on a spherical jig according to the invention.

As depicted in FIG. 6, camera B is also mounted in the spherical jig which vertical ribs being spaced 10° apart. Using camera B, approximately 12 vertical ribs are visible demonstrating that the horizontal field of view of camera B is approximately 110°. Distortion is again shown by the amount of curvature of the lines in the image, and in FIG. 6, the curvature of vertical and horizontal lines is more pronounced, i.e. camera B produces a greater amount of distortion. Distortion was greater as the viewing angle of camera B was also much greater.

Figure 7:
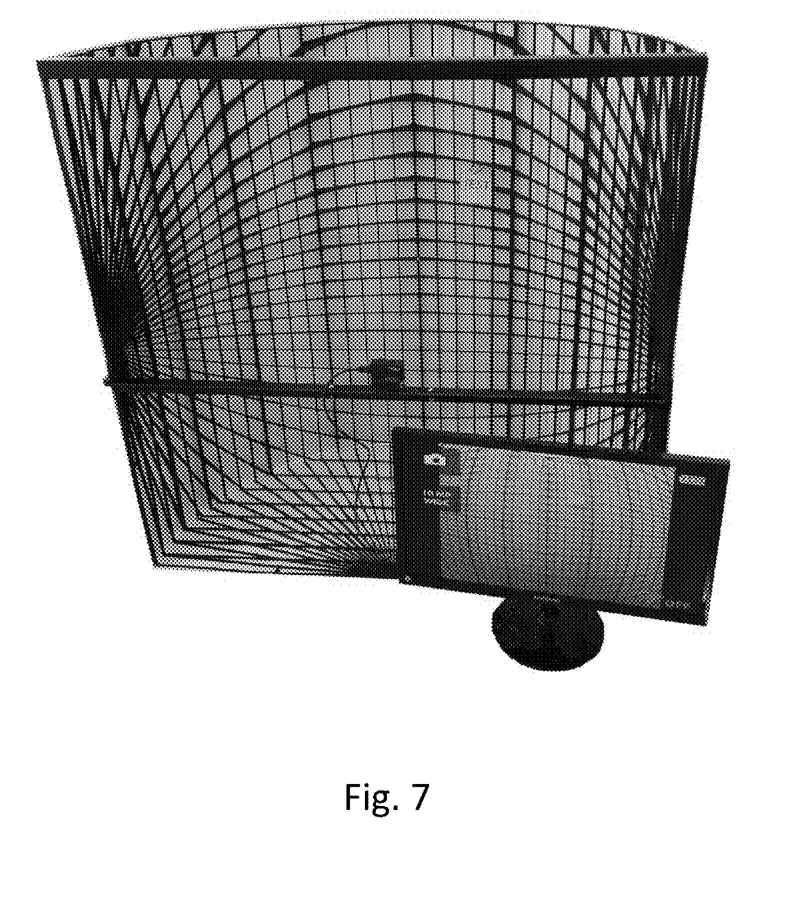
FIG. 7 shows a reference photographic image of the results of testing of camera C on a cylindrical jig according to the invention.
Figure 8:
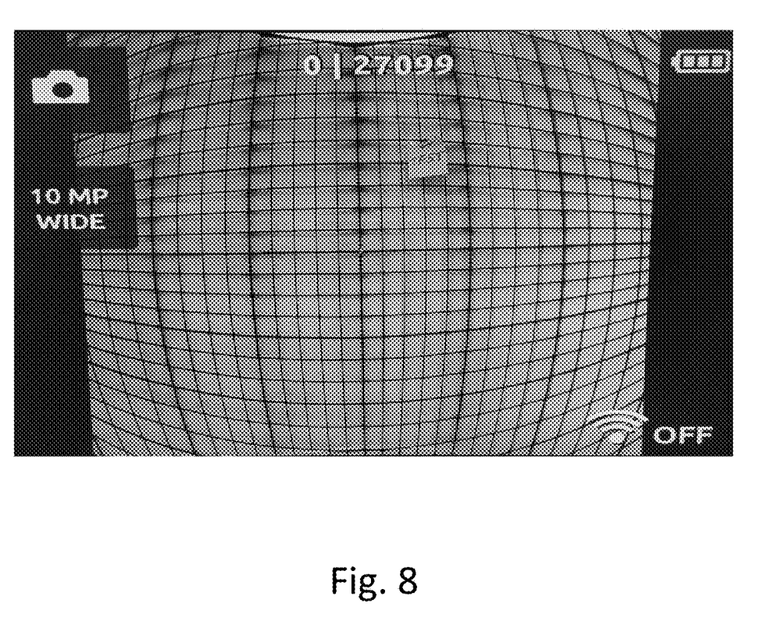
FIG. 8 shows a reference photographic image of the results of testing of camera C from the optical viewing angle of camera C on a cylindrical jig showing distortion.

FIG. 7 and FIG. 8 show the results of testing of camera C mounted in a cylindrical embodiment of the jig. Vertical ribs are spaced 5° apart, and results of testing show that camera C has a horizontal field of view of approximately 125°. Distortion, as seen from the curvature of the lines, is proportional to the increased viewing angle.

Figure 9:
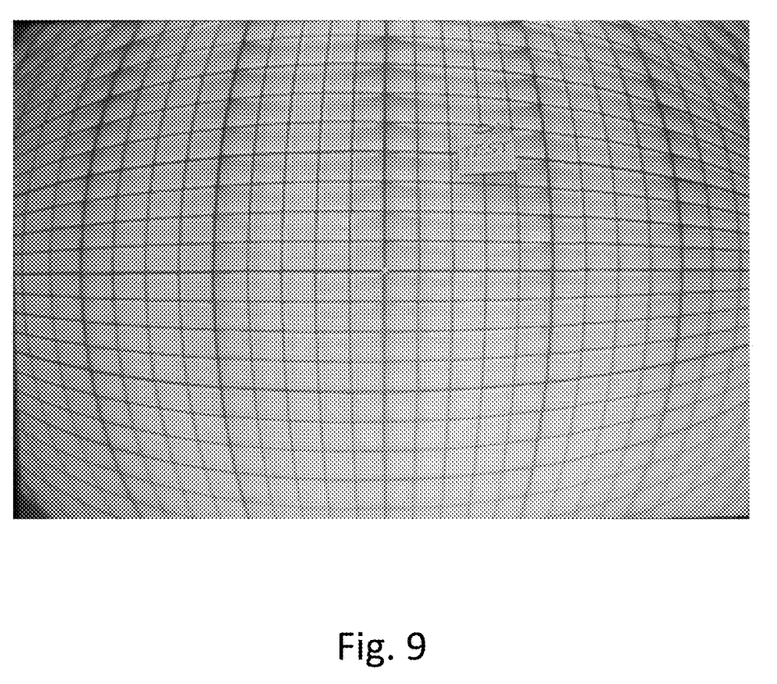
FIG. 9 shows a reference real time photographic image prior to distortion correction at 60 frames per second according to the invention.
Figure 10:
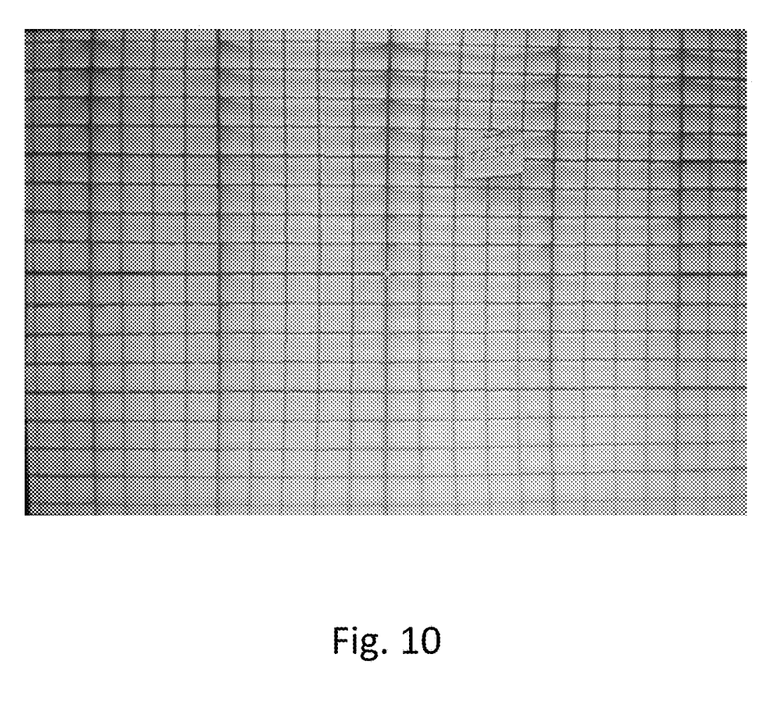
FIG. 10 shows a reference real time photographic image after real time distortion correction at 60 frames per second according to the invention.

The jig provides a means to measure the amount of distortion caused by a particular camera lens, and based on these measurements, the inventor developed correction algorithms to correct the distortion caused by the camera lens in real time as the image was generated using a video camera. Once the image correction parameters are determined for a particular camera lens, the real time image obtained from the camera may be corrected immediately by a CPU, without the need for post image processing to correct for distortion. The corrected image may then be immediately displayed as a single output image on a monitor or other display means. FIG. 9 shows a distorted image without correction, and FIG. 10 shows an image corrected in real time utilizing the image correction procedures developed from distortion measurements obtained through use of the jig. The invention vastly decreases the processing time allowing real time video images to be taken without distortion. The invention permits near instantaneous distortion correction such that images taken from a video camera at 60 frames per second may be immediately corrected to display an undistorted video image in real time. Faster, almost immediate distortion correction, as provided by the subject invention, saves the cost of countless man hours which would be utilized to manually correct distorted video images after the image was generated.

More than one camera may be used simultaneously to increase the overall field of view when the images from the cameras are combined. Utilizing the devices and methods of the prior art, creating a single real time video image by combining the images from more than one video camera is impossible as each camera creates a distorted video image which will not align properly with the distorted video image of another camera. Utilizing prior art methods, post image processing to combine multiple video images into a single image to increase the overall field of view would be extremely time consuming rendering such application impractical and unworkable.

The subject invention enables the images from all video cameras to be instantaneously corrected such that the image from one camera will properly align with the corrected image of an adjacent video camera in real time so that the images can be merged into a single output image by a CPU and subsequently displayed. The images may be manipulated vertically and horizontally to assist in aligning the images. The jig enables the user to properly calibrate the appropriate correction for each camera such that images may be seamlessly aligned in real time without the need for post image processing. For example, if a first video camera captures a field of view of 100° and a second identical video camera is angled adjacent to the first video camera with images overlapping by 10°, the combined total field of view of the two video cameras becomes 190° and the real time images from each camera may be adjusted to correct for distortion and combined to form a single undistorted image with a field of view of 190°.

The degrees of measurement as indicated herein serve merely as examples are not in any way limiting to the total achievable field of view. For instance, a series of video cameras may be arranged to produce a continuous undistorted video image with a complete 360° field of view. Cameras may be arranged to produce images viewed horizontally as well as vertical imagery surrounding the cameras.

Figure 11:
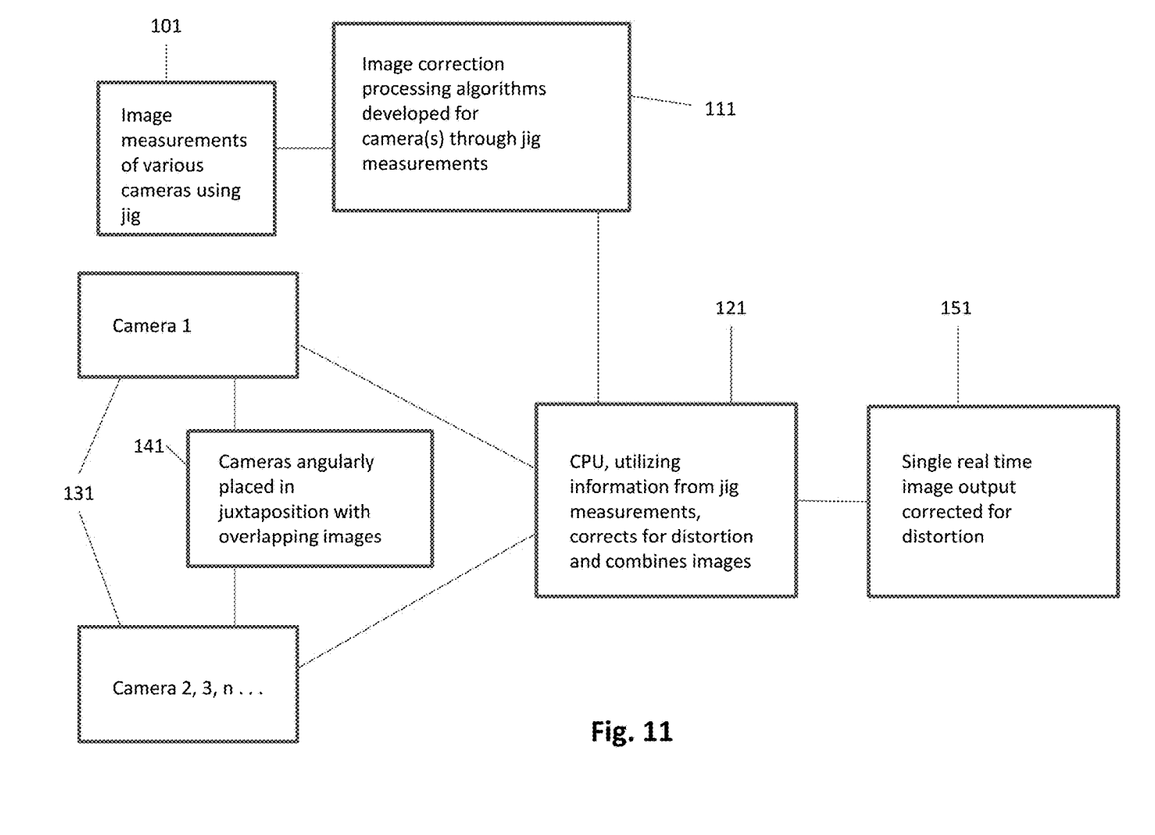
FIG. 11 shows a flowchart of a process for real time correction of distortion of video images and combination into a single real time image according to the invention.

As shown in FIG. 11, image measurements are taken using the jig 101 and the image data is then used to develop distortion correction algorithms for a particular camera 111. The adjustment algorithms are relayed to a CPU 121 to instantaneously correct distorted video images as they are delivered to the CPU. One or more video cameras 131, whose distortion properties have been previously analyzed using the jig, are positioned angularly adjacent to each other 141 such that the images created by each camera overlap. The images are delivered as they are generated to the CPU which instantaneously corrects the images to remove distortion and combines the images to create a single undistorted real time output image with a field of view covered by the combination of all of the cameras 151. The output image may be displayed on a television or computer monitor or other type of electronic display, or may be delivered to another medium for display.

The applications for the invention are limitless. The invention was developed to solve problems in the marine industry where the view was limited. The invention provides a full undistorted perspective in real time enabling the boat captain to avoid dangers associated with striking objects when the danger is imminent. The camera system of the invention provides a full perspective of the topography which allows the captain to avoid dangers such as rocks or objects, and the invention corrects distortion in real time so that the captain is able to avoid the rocks immediately as they are perceived with an undistorted image which accurately shows the positions of the objects. Post image processing is impossible practically, and the invention overcomes the limitations of the prior art by providing a wide angle view with real time processing of video images.

However, the invention may be used in any number of other applications. The camera system of the invention may also be used wherever there is the need for surveillance. By way of example, in the casino industry, a camera system of the invention may be used on a casino floor to view a large area thus eliminating the need for multiple cameras positioned in multiple locations. The camera system of the invention may also be regularly used in virtually any type of business and retail establishment as a deterrent to theft and other types of crimes.

The invention has been disclosed in terms of preferred embodiments which fulfill all of the objects of the present invention and overcome the limitations of the prior art. Various changes, modifications, and alterations from the teachings of the present invention may be contemplated by those skilled in the art without departing from the intended spirit and scope thereof. It is intended that the present invention only be limited by the terms of the appended claims.

I claim:
1. A wide angle video camera system comprising:
a jig for obtaining measurements of field of view and amount of distortion of at least one video camera, the jig comprising at least two horizontal ribs both joining at a horizontal first point of the jig and both joining at a horizontal second point of the jig and wherein the jig further comprises at least two vertical ribs both joining at a vertical first point of the jig and both joining at a vertical second point of the jig,
the at least one video camera mounted within the jig and facing the at least two horizontal ribs and the at least two vertical ribs to generate images of the at least two horizontal ribs and the at least two vertical ribs, the at least two horizontal ribs and the at least two vertical ribs displayed in the at least one video camera with increasing distortion with increasing field of view,
a central processing unit operatively receiving the images from the at least one video camera, the central processing unit utilizing measurements of distortion with increasing field of view, obtained from use of the jig and the at least one video camera, and the central processing unit processing the images from the at least one video camera to correct distortion in the images created by the at least one video camera, and
a display for displaying a distortion corrected output image as a two dimensional image.
2. A wide angle video camera system as in claim 1, wherein the jig comprises a hemispherical shape or cylindrical shape and a camera support.
3. A wide angle video camera system as in claim 2, wherein the jig comprises a camera mounting plate positioned centrally within the jig on the camera support.
4. A wide angle video camera system as in claim 1, wherein the at least two horizontal ribs appear as at least two horizontal lines to the at least one video camera located centrally on a camera support, and wherein the at least two vertical ribs appear as at least two vertical lines to the at least one video camera located centrally on the camera support.
5. A wide angle video camera system comprising:
a jig for obtaining measurements of field of view and amount of distortion of video cameras, the jig comprising at least two horizontal ribs both joining at a horizontal first point of the jig and both joining at a horizontal second point of the jig and wherein the jig further comprises at least two vertical ribs both joining at a vertical first point of the jig and both joining at a vertical second point of the jig,
a first video camera mounted within the jig and facing the at least two horizontal ribs and the at least two vertical ribs to generate images of the at least two horizontal ribs and the at least two vertical ribs, the at least two horizontal ribs and the at least two vertical ribs dis- played in the first video camera with increasing distortion with increasing field of view, a second video camera mounted within the jig and facing the at least two horizontal ribs and the at least two vertical ribs to generate images of the at least two horizontal ribs and the at least two vertical ribs, the at least two horizontal ribs and the at least two vertical ribs displayed in the second video camera with increasing distortion with increasing field of view, a central processing unit operatively receiving the images from the first video camera and the second video camera, the central processing unit utilizing measurements of distortion within increasing field of view, obtained from use of the jig and the first video camera and the second video camera, and the central processing unit processing the images from the first video camera and the second video camera to correct distortion in the images created by the first video camera and the second video camera, and joining the images created by the first video camera and the second video camera to create a distortion corrected output image, and a display for displaying the distortion corrected output image as a two dimensional image.

6. A wide angle video camera system as in claim 5, wherein the jig comprises a hemispherical shape or cylindrical shape and a camera support.

7. A wide angle video camera system as in claim 6, wherein the jig comprises a camera mounting plate positioned centrally within the jig on the camera support.

8. A wide angle video camera system as in claim 5, wherein the at least two horizontal ribs appear as at least two horizontal lines to the first video camera and the second video camera located centrally on a camera support, and wherein the at least two vertical ribs appear as at least two vertical lines to the first video camera and the second video camera located centrally on the camera support.

9. A jig for obtaining measurements of field of view and amount of distortion of video cameras, the jig comprising a hemispherical shape or cylindrical shape and further comprising at least two horizontal ribs both joining at a horizontal first point of the jig and both joining at a horizontal second point of the jig and wherein the jig further comprises at least two vertical ribs both joining at a vertical first point of the jig and both joining at a vertical second point of the jig.

10. A jig for obtaining measurements of field of view and amount of distortion of video cameras as in claim 9 further comprising a camera support.

11. A jig for obtaining measurements of field of view and amount of distortion of video cameras as in claim 10 further comprising a camera mounting plate positioned centrally within the jig on the camera support.

12. A jig for obtaining measurements of field of view and amount of distortion of video cameras as in claim 9 further comprising a frame defining the perimeter of the hemispherical shape or cylindrical shape.

13. A method for obtaining undistorted wide angle video images comprising:

utilizing a jig to measure field of view and amount of distortion of at least two video cameras by placing the at least two video cameras within the jig, the jig comprising at least two horizontal ribs both joining at a horizontal first point of the jig and both joining at a horizontal second point of the jig and wherein the jig further comprises at least two vertical ribs both joining at a vertical first point of the jig and both joining at a vertical second point of the jig, and the at least two horizontal ribs and the at least two vertical ribs displayed in the at least two video cameras with increasing distortion with increasing field of view, and analyzing images created by the at least two video cameras, creating algorithms for distortion correction utilizing the measurements obtained from placement of the at least two video cameras within the jig, inputting the algorithms into a central processing unit, creating images from the at least two video cameras and delivering the images to the central processing unit, utilizing the algorithms and the central processing unit to correct distortion of the images from the at least two video cameras, placing the images in juxtaposition such that the images created by the at least two video cameras overlap, merging the images into a single distortion corrected output image, and displaying the single distortion corrected output image as a two dimensional image.

14. A wide angle video camera system comprising:

a jig for obtaining measurements of field of view and amount of distortion of at least two video cameras, the jig comprising at least two horizontal ribs both joining at a horizontal first point of the jig and both joining at a horizontal second point of the jig and wherein the jig further comprises at least two vertical ribs both joining at a vertical first point of the jig and both joining at a vertical second point of the jig, the at least two video cameras mounted within the jig and facing the at least two horizontal ribs and the at least two vertical ribs to generate images of the at least two horizontal ribs and the at least two vertical ribs, the at least two horizontal ribs and the at least two vertical ribs displayed in the at least two video cameras with increasing distortion with increasing field of view, a central processing unit operatively receiving the images from tie at least two video cameras, the central processing unit utilizing measurements of distortion with increasing field of view, obtained from use of the jig and the at least two video cameras, and the central processing unit processing the images from the at least two video cameras to correct distortion in the images created by the at least two video cameras, and joining the images created by the at least two video cameras to create a distortion corrected output image, and a display for displaying the distortion corrected output image as a two dimensional image.

* * * * *